(12) United States Patent
Ahn

(10) Patent No.: US 6,840,499 B2
(45) Date of Patent: Jan. 11, 2005

(54) SOLENOID CONTROLLED VALVE OF ANTI-LOCK BRAKE SYSTEM

(75) Inventor: Dong-Ho Ahn, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/330,193

(22) Filed: Dec. 30, 2002

(65) Prior Publication Data

US 2004/0011981 A1 Jan. 22, 2004

(30) Foreign Application Priority Data

Jul. 16, 2002 (KR) ........................................ 2002-41688

(51) Int. Cl.[7] .............................. B60T 8/36; F16K 31/02
(52) U.S. Cl. ................................ 251/129.14; 303/119.2
(58) Field of Search ...................... 251/129.02, 129.14, 251/129.15; 303/119.1, 119.2; 137/454.2

(56) References Cited

U.S. PATENT DOCUMENTS

| | | | | |
|---|---|---|---|---|
| 4,252,094 A | * | 2/1981 | Draxler ................. | 251/129.14 |
| 4,640,391 A | * | 2/1987 | Maehara et al. ....... | 251/129.14 |
| 4,674,536 A | * | 6/1987 | Warrick ................. | 251/129.14 |
| 5,439,279 A | * | 8/1995 | Linkner et al. ........ | 251/129.15 |
| 5,865,213 A | * | 2/1999 | Scheffel et al. ........ | 251/129.15 |
| 5,879,060 A | * | 3/1999 | Megerle et al. ........ | 303/119.2 |
| 6,120,003 A | * | 9/2000 | Lubischer et al. ..... | 251/129.02 |
| 6,189,985 B1 | * | 2/2001 | Fritsch et al. .......... | 303/119.2 |
| 6,213,570 B1 | * | 4/2001 | Gegalski et al. ........ | 303/119.2 |
| 6,390,117 B2 | * | 5/2002 | Zapf ...................... | 251/129.14 |
| 6,439,265 B1 | * | 8/2002 | Gruschwitz et al. ... | 251/129.02 |
| 6,471,305 B1 | * | 10/2002 | Leventhal et al. ....... | 303/119.2 |

OTHER PUBLICATIONS

U.S. patent application Ser. No. 10/322,733, filed Dec. 19, 2002, inventor Ahn.*
U.S. patent application Ser. No. 10/322,734, filed Dec. 19, 2002, inventor Ahn.*
U.S. patent application Ser. No. 10/322,735, filed Dec. 19, 2002, inventor Ahn et al.*

* cited by examiner

*Primary Examiner*—Eric Keasel
(74) *Attorney, Agent, or Firm*—Greenblum & Bernstein, P.L.C.

(57) ABSTRACT

A solenoid-controlled valve of an anti-lock brake system includes: a modulator block with inflow and outflow ports; an accommodating part connecting the ports including a valve sheet having a valve seat and an outflow cavity connected with the outflow port; a filter installed between the outflow cavity and the outflow port; a ball supporting part formed on a center of a housing in lengthwise direction; a spring supporting part formed on the ball supporting part; a compressing spring joined to the spring supporting part; a ball supported by an end terminal of the compressing spring; wherein the housing has a magnetic material and a coil body, and the ball opens and closes the valve seat due to the magnetic flux of the solenoid and force of the compressing spring.

2 Claims, 3 Drawing Sheets

SOLENOID CONTROLLED VALVE OF ANTI-LOCK BRAKE SYSTEM

BACKGROUND OF THE INVENTION

1. Field of the Invention

The present invention relates to a solenoid controlled valve of an anti-lock brake system, and particularly to a solenoid controlled valve of an anti-lock brake system such that: a modulator block having an inflow port and an outflow port is included; a value sheet is accommodated in an accommodating part formed in an interior of the modulator block; a housing formed by an electromagnet is joined to the valve sheet; a coil is combined to an outer peripheral plane of the housing, so that when a current is applied to the coil, magnetic fields is generated, and due to the housing formed by the electromagnet and back and forth movement of a ball accommodated in an end of the housing and an interior of the valve sheet, a valve port of an opening and closing cavity formed on the valve sheet is sealed, whereby a fluid is blocked.

2. Description of the Related Art

Generally, a sliding preventing braking system of a solenoid valve used for brake in a vehicle on which ABS (Antilock Braking System) is mounted, is configured such that: an ECU (Electronic Controlling Unit) detects the speed of a vehicle; the ECU transfers a signal to an actuator for control depending on road surface; the actuator prevents lock of a vehicle wheel by controlling oil pressure of a brake in each wheel cylinder using the signal from the ECU.

For an apparatus for controlling the speed of a vehicle by operation that brake oil flows into the modulator block from a master cylinder so that an oil pressure is adjusted, a solenoid valve for the ABS of the related art will be described in the following with reference to FIG. 1.

The solenoid valve for the ABS of the related art consists of: a modulator block 10 having an inflow port 11 and an outflow port 12; a housing 20 mounted on an interior of the modulator block 10 and having an outflow cavity 21; a plunger 30 mounted on an interior of the housing 20 and having a projecting portion 31 in its end terminal; a valve sheet 40 formed on a side of the projecting portion 31 of the plunger 30 and accommodated in an interior of the housing 20; a compressing spring 50 joined to the projecting portion 31 of the plunger 30, supported by lateral portion of the valve sheet 40; in which an orifice 60 between the valve sheet 40 and the inflow port 11, is joined to the housing 20; a cover 70 joined to a lateral portion of the housing 20, for accommodating the plunger 30; in which the plunger 30 is made of a permanent magnet. Therefore, when a current is applied to a coil 80, the plunger 30 makes back and forth movements with respect to an opening and closing cavity 41 of the valve sheet 40, whereby the valve port is opened and closed, and brake oil amount is adjusted accordingly.

The solenoid valve of the related art, having the foregoing construction for the ABS, requires a bushing 1 and an O-ring 2 for joining the housing 20 to the modulator block 10, requiring an armature 3 accommodated in an interior of the coil 80 and joined to the plunger 30 and having a magnetic material, and requiring the orifice 60 for adjusting brake oil amount coming from the inflow port 11, and the cover 70 for preventing brake oil from flowing into an outer peripheral plane of the valve sheet 40.

As the foregoing, the solenoid valve of the related art, consists of a plurality of parts. Therefore, problems that assembly process is very complicated and inconvenient, and volume and weight of the solenoid valve become large and heavy, and production costs are increased, are generated.

SUMMARY OF THE INVENTION

To solve the above-indicated problems, it is, therefore, an object of the present invention to provide a solenoid controlled valve of an anti-lock brake system by incorporating a plunger, an armature, a housing into one single member, and by incorporating an orifice, a seal cup, a valve sheet into one single member, and by providing a ball for an opening and closing means sealed on and detached from an opening and closing cavity, whereby the volume is reduced half of the volume of the related art and production costs are reduced due to reduction of parts and new technology is achieved.

The foregoing and other objects and advantages are realized by providing a solenoid controlled valve of an anti-lock brake system, which includes: a modulator block; an inflow port formed on the modulator block; an outflow port formed on the modulator block and running through the inflow port; an accommodating part formed in an interior of the modulator block, for connecting the outflow port and the inflow port; a valve sheet mounted in an interior of the accommodating part, and having an opening and closing cavity in its one side, having an opening in its other side; an outflow cavity formed on an outer periphery of the valve sheet, for being connected with the outflow port; a filter installed between the outflow cavity and the outflow port; a housing adhered to a lateral side of the filter and joined to an inside of the opening; a ball supporting part formed on a center of the housing in lengthwise direction; a spring supporting part formed on an outer cylindrical surface of the ball supporting part; a compressing spring joined to the spring supporting part; a ball supported by an end terminal of the compressing spring; wherein the housing has a magnetic material, a coil body is joined to an outer peripheral plane on one side of the housing, and the ball is adhered to and detached from the opening and closing cavity by the ball supporting part and the compressing spring.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
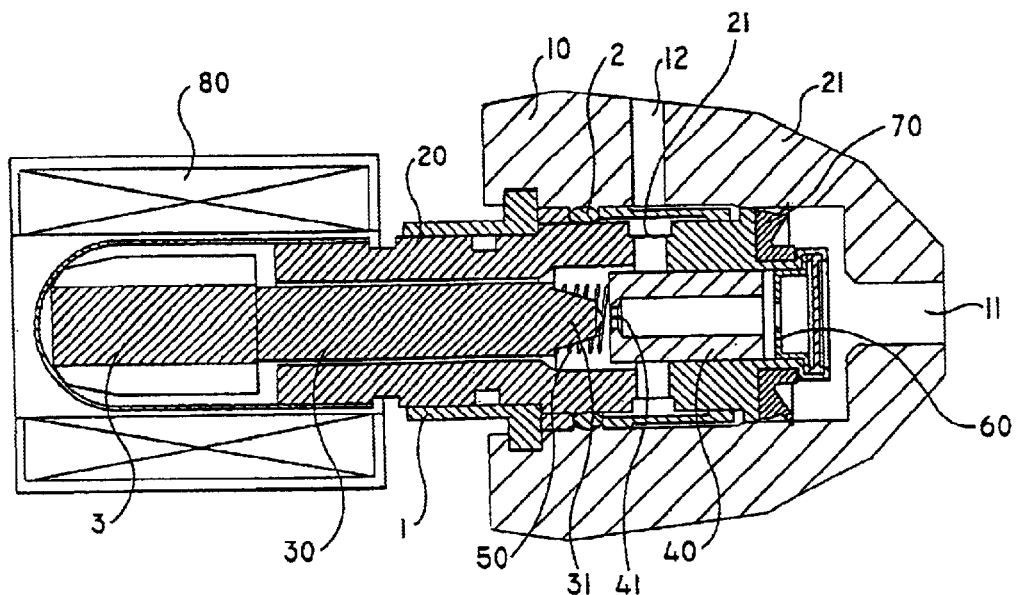
FIG. 1 is a cross-sectional view of a solenoid valve for vehicle brake system of the related art.

A preferred embodiment of the present invention will now be described with reference to the accompanying drawings.

In the following description, same drawing reference numerals are used for the same elements even in different drawings.

Figure 2:
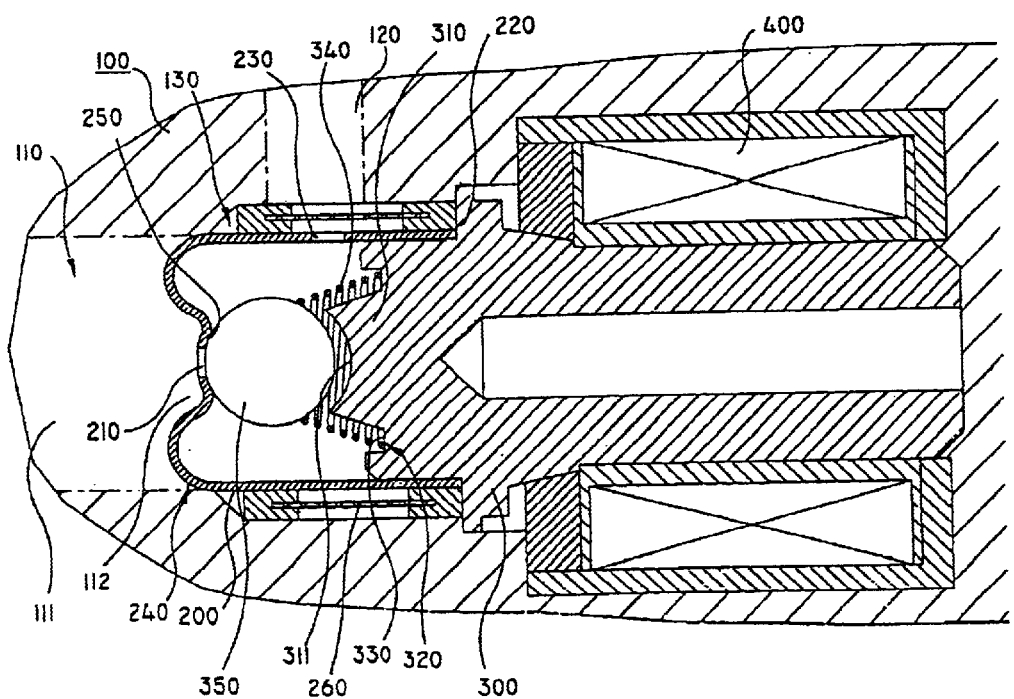
FIG. 2 is a side, cross-sectional view of a solenoid controlled valve of anti-lock brake system according to the present invention.
Figure 3:
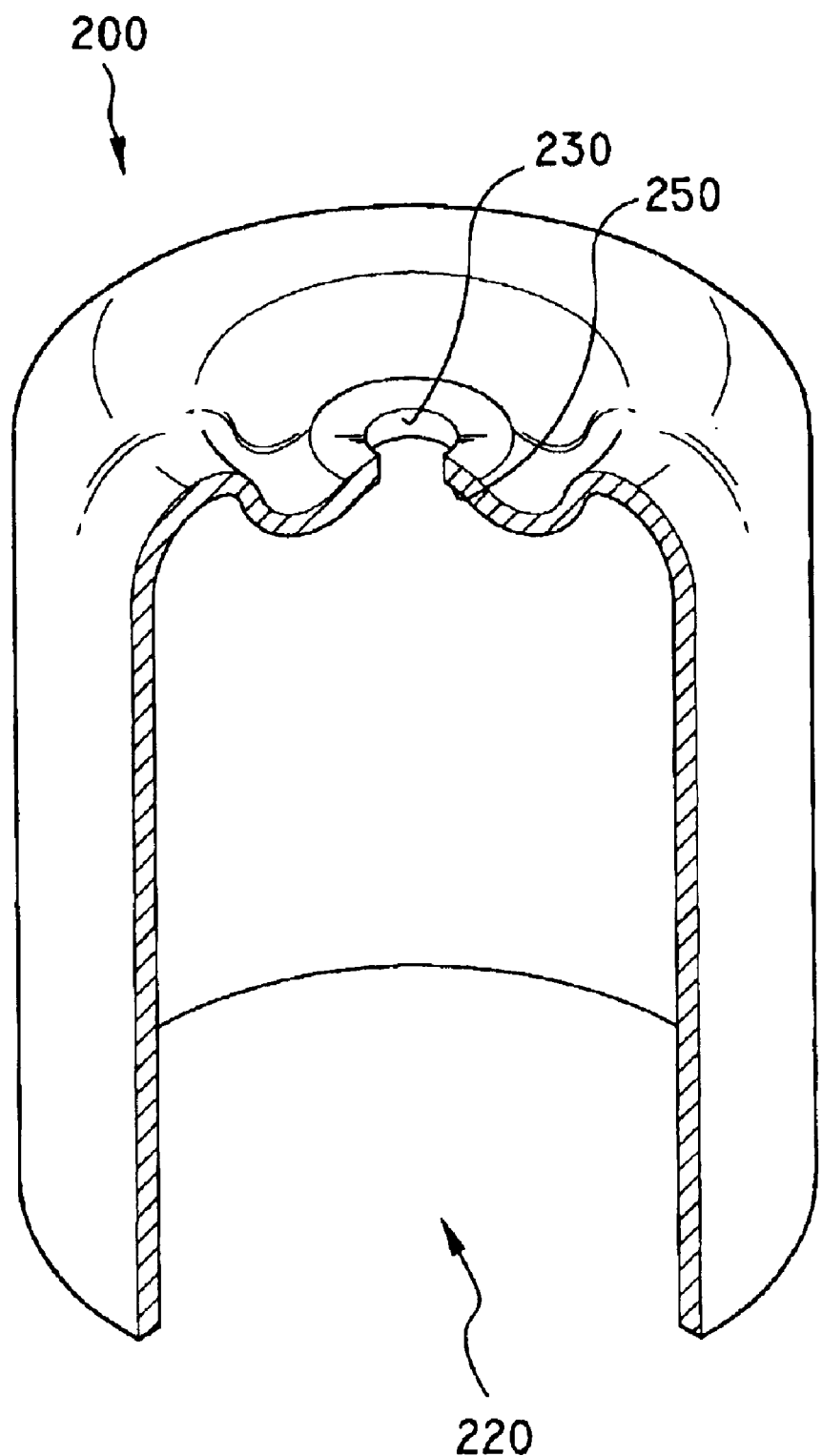
FIG. 3 is a cut-off, perspective view of a valve sheet according to the present invention.
Figure 4:
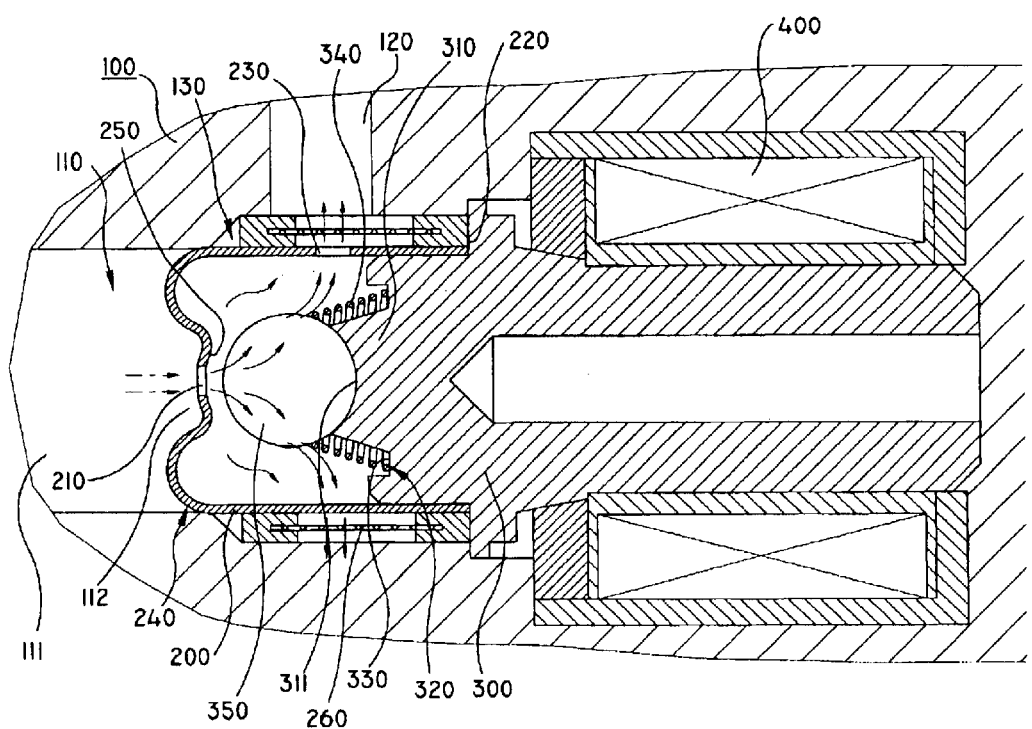
FIG. 4 is a side, cross-sectional view illustrating operation of a valve according to the present invention.

FIG. 2 is a side, cross-sectional view of solenoid controlled valve of anti-lock brake system according to the present invention, FIG. 3 is a cut-off, perspective view of a valve sheet according to the present invention, and FIG. 4 is a side, cross-sectional view illustrating operation of a valve according to the present invention.

First of all, as shown in FIG. 2, the modulator block 100 includes an inflow port 110 having a flowing path so that brake oil may inflow from a master cylinder, and an outflow port 120 for draining the inflowing brake oil to a wheel cylinder.

Also, the inflow port 110 and the outflow port 120 are connected, so that an accommodating part 130 is formed in an interior of the modulator block 100. The inflow port 110 is divided into an inlet flowing path 111 and an outlet flowing path 112, and is mounted in the accommodating part 130, and one side of a valve sheet 200 is joined to the outlet flowing path 112.

Here, the valve sheet 200 is inserted in the outlet flowing path 112, so that a self sealing part 240 is formed for isolation from the inlet flowing path 111. Further, an outflow cavity 230 for running through the outflow port 120, is formed on an outer periphery of the valve sheet 200. Also, a filter 260 is formed between the outflow cavity 230 and the outflow port 120, and is joined to the outer peripheral plane of the valve sheet 200.

In the meantime, a housing 300 is adhered to a lateral side of the filter 260 and is joined to an inside of the opening 220.

A housing 300 joined to the valve sheet 200, has a ball supporting part 310 in its center of lengthwise direction. The ball supporting part 310 has a spring supporting part 320 on the outer cylindrical surface. Here, the spring supporting part 320 is preferably formed by a groove 330. Also, a compressing spring 340, one side of which is mounted on the spring supporting part 320 and the other side of which supports a ball 350, is joined to an outer peripheral plane of the ball supporting part 310.

Here, the ball supporting part 310 is of a shape such that an cylindrical surface of the groove 330 on which the compressing spring 340 is mounted, is large and the end terminal for supporting the ball gets small. Also, the ball supporting part 310 supported by an end terminal of the compressing spring 340, is joined to the ball 350 adhered to the opening and closing cavity 210.

Further, the ball supporting part 310 is preferably of a shape having concave portion 311 for accommodating the ball 350 when the ball 350 is detached from the opening and closing cavity 210.

In the meantime, the housing 300 has, on its one side, the ball supporting part 310 and is joined to the valve sheet 200 and has, on its other side, a shape of shaft so that a coil body 400 is joined to an outer peripheral surface. Here, the housing 300 has a magnetic material and is made of aluminum.

Shape of the valve sheet will be described in detail with reference to a cut-off, perspective view of the valve sheet according to the present invention as shown in FIG. 3.

The valve sheet 200 has a sticking plane 250 coming into contact with a ball 350 at a side of the opening and closing cavity 210. The sticking plane 250 has an arc whose size is the same as the size of the relevant portion in the outer peripheral plane of the ball 350.

A rounded portion extended from the sticking plane 250, is formed inward by first bending so that the rounded portion encloses a partial plane of the ball 350. Also, another rounded portion having a big arc, extended from the rounded portion formed by the first bending, is formed outward by second bending, and still another rounded portion extended from the rounded portion formed by the second bending, is formed in a joining portion of the valve sheet 200 so that the rounded portion completes the outlet flowing path 112 of the inflow port 110.

The cross-sectional shape of the valve sheet 200 is symmetric with respect to the center of the opening and closing cavity 210, and the bending portions are formed by rolling process using press, and preferably made of stainless steel.

Operation of the solenoid controlled valve of the anti-lock brake system having the foregoing construction, will be described with reference to FIG. 4 in the following.

In the anti-lock brake system according to the present invention, in case that the ECU of the ABS determines to make a control for generating brake oil flow between the inflow port and the outflow port according to a signal from a detecting sensor for sensing a vehicle wheel speed and a road surface, the ECU applies a current to the coil body 400.

If a current is applied to the coil body 400, magnetic force is generated and transferred to the housing 300 having the magnetic material. The ball supporting part 310 attracts the ball 350 by the magnetic force transferred to the housing 300, so that the opening and closing cavity 210 formed on the valve sheet 200 is opened.

In that case, because the flowing path between the inflow port 110 and the outflow port 120 is opened, the brake oil is drained to the wheel cylinder from the master cylinder.

In the first place, one side of the ball 350 is supported by the compressing spring, which is joined to grooves 330 formed on the outer peripheral surface of the ball supporting part 310. Also, one side of the ball 350 is pushed by the elastic force of the compressing spring 340, and the other side of the ball 350 seals the opening and closing cavity 210 formed on the sticking plane 250 of the valve sheet 200.

In case that the opening and closing cavity is opened, the brake oil is provided through the inflow port 110 from the master cylinder and is delivered to the opening and closing cavity 210 of the valve sheet 200 mounted on the outlet flowing path 112 of the inflow port 110, and is transferred to the outflow cavity 230 formed on the outside of the valve sheet 200. After that, the brake oil passes through the filter 260, where an alien substance is eliminated, and flows to the wheel cylinder past the outflow port 120.

Here, in order for swift flowing of the brake oil, the valve sheet 200 has a plurality of bending portions on its lateral side, so that the brake oil is provided to the opening and closing cavity 210. In other aspect, a plurality of bending portions is formed for resisting the elastic force of the compressing spring pushing the ball 350, and for accommodating the ball 350.

In the meantime, in case that it is determined that flowing path between the inflow port 110 and the outflow port 120, should be closed, a current applied to the coil 400 is cut off, so that the brake oil flow is stopped.

Namely, the opening and closing cavity 210 is opened by a current applied to the coil body 400 under control of the ECU and is closed by the elastic force of the compressing spring 340, whereby the brake oil flow between the inflow port 110 and the outflow port 120 is possibly controlled.

As is apparent from the foregoing, the present invention has the following effects.

Firstly, the housing, the plunger and armature of the related art are incorporated into one single member, whereby remarkable reduction in parts and reduction in costs are achieved.

Secondly, the valve sheet is installed in the outlet flowing path of the inflow port of the housing so that blocking barrier separating from the inlet flowing path is formed without additional work and process, whereby assembling process becomes simple.

Thirdly, the opening and closing cavity side of the valve sheet has the sticking plane coming into contact with the ball and the valve sheet has the rounded portion connected with the sticking plane, and bent outward, for enclosing partial plane of the ball in its inside, so that the seal cup, the orifice, and the valve sheet are incorporated into one single member, whereby reduction in parts is possibly achieved.

Fourthly, the shape of the opening and closing cavity in the valve sheet is formed by the rounded portion due to a plurality of bending, so that the valve sheet is not transformed when used for a long time and the brake oil amount in the flowing path is maintained constant. Therefore, brake control is performed smoothly.

Resultantly, the present invention has effects of making assembly process easy and simple, reducing weight, and reducing production costs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A solenoid controlled valve of an anti-lock brake system comprising:
    a modulator block;
    an inflow port formed on the modulator block;
    an outflow port formed on the modulator block;
    an accommodating part formed in an interior of the modulator block, that connects the outflow port and the inflow port;
    a valve sheet mounted in an interior of the accommodating part, and having an opening and closing cavity in its one side, having an opening in its other side;
    an outflow cavity formed on an outer periphery of the valve sheet, and connected with the outflow port;
    a filter installed between the outflow cavity and the outflow port;
    a housing adhered to a lateral side of the filter and joined to an inside of the opening;
    a ball supporting part formed on a center of the housing in lengthwise direction;
    a spring supporting part formed on an outer cylindrical surface of the ball supporting part;
    a compressing spring joined to the spring supporting part;
    a ball supported by an end terminal of the compressing spring;
    wherein the housing has a magnetic material, a coil body is joined to an outer peripheral plane on one side of the housing, and the ball is adhered to and detached from the opening and closing cavity by the ball supporting part and the compressing spring.

2. The valve according to claim 1, wherein the opening and closing cavity of the valve sheet has a sticking plane coming into contact with the ball, and has a rounded portion extended from the sticking plane and bent outward, to enclose a partial plane of the ball in its inside, in which a cross-sectional shape of the valve sheet is symmetric with respect to a center of the opening and closing cavity.

* * * * *